Patented Mar. 9, 1943

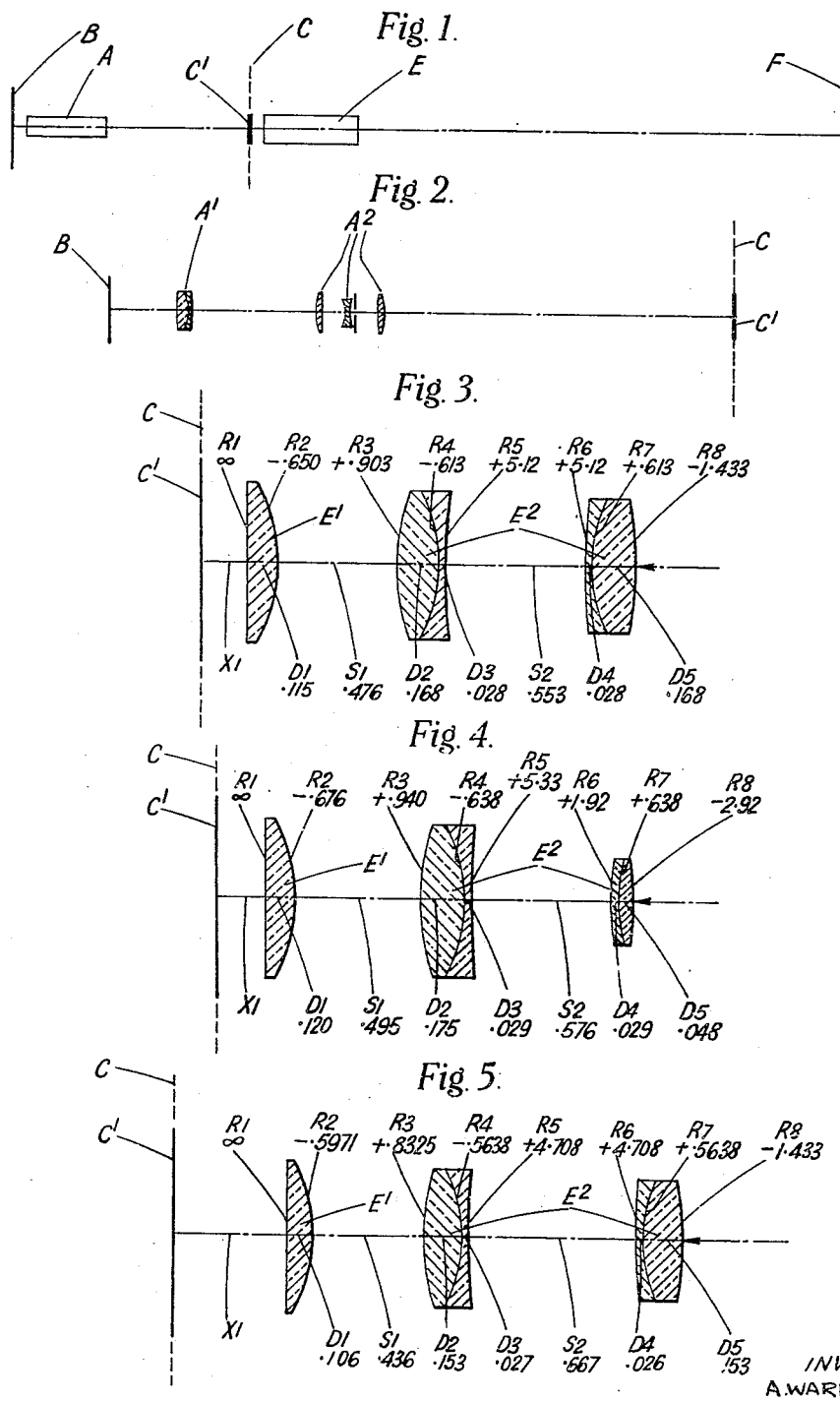

2,313,460

UNITED STATES PATENT OFFICE 2,313,460

COMPOUND MICROSCOPE AND LENS SYSTEM THEREFOR

Arthur Warmisham, Leicester, England, assignor to Kapella Limited, Leicester, England, a company of Great Britain Application January 23, 1941, Serial No. 375,684
In Great Britain January 23, 1940

17 Claims. (Cl. 88—57)

This invention relates to compound microscopes and more particularly to a lens system, corrected for chromatic aberrations, astigmatism, field curvature and distortion, such as may be used as the ocular thereof. A compound microscope normally consists of an objective for forming a primary image of the object in the plane of a diaphragm, and an ocular comprising a convergent field lens adjacent to the primary image plane in conjunction with a convergent eye lens.

It is often preferred in practice to observe an image projected on to a screen rather than to employ a microscope in the usual way with direct visual observation, and in particular it may be desired to project the image of the profile of an object on to a master drawing, in order to determine whether the object has the correct shape or dimensions. The use of a compound microscope for such purpose has the advantage of giving a high magnification ratio with a relatively small distance between the object and the projection screen, but existing microscope oculars usually have a considerable residue of uncorrected distortion which obviously makes them unsuitable for the purpose of comparison of the image with a master drawing.

The present invention has for its primary object to provide a lens system suitable for use as a projection ocular for a compound microscope and having improved distortion correction and gold oblique colour correction.

The lens system according to the invention conveniently comprises a convergent field lens, and a convergent eyelens system whole focal length lies between 115 and 140 per cent of the equivalent focal length of the complete lens system and whose axial thickness is not less than 60 per cent of the equivalent focal length of the complete lens system. It is to be noted that the term "eyelens system" is employed herein to denote the lens or lenses cooperating with the field lens to form the ocular, entirely irrespective of whether a single lens or more than one lens is employed. In fact, the convergent eyelens system preferably comprises at least two air-separated convergent components, and in one convenient arrangement consists of two compound components separated by an airgap.

Such a lens system, when used as the ocular of a compound microscope, has its field lens disposed adjacent to the primary image plane of the objective of the microscope. The exit pupil of the ocular preferably lies either within the eyelens system or at a distance behind the rear surface of the eyelens system not greater than 15 per cent of the equivalent focal length of the ocular. In one convenient form the objective of the microscope is arranged in the manner described in British patent specification No. 444,350, and comprises two convergent components, of which the first is a field member adapted to form an image of the light source at the entrance pupil of the second component which acts to correct the outstanding aberrations of the first component.

The invention may be carried into practice in various ways, but the accompanying drawing illustrates by way of example a preferred arrangement of compound microscope according thereto intended for projection purposes, with three alternative forms of ocular for use therein. In the drawing, Figure 1 diagrammatically illustrates the complete microscope, Figure 2 shows one convenient form of objective for use in the microscope of Figure 1, and Figures 3 to 5 show the three alternative forms of ocular for use in the microscope of Figure 1.

In this arrangement the objective, indicated at A in Figure 1 and shown in detail in Figure 2, forms its primary image of an object at B in the plane C of a diaphragm, and a graticule $C^1$ is provided in this primary image plane C. The ocular E, shown in detail in three alternative forms in Figures 3 to 5, may be regarded as a development of the well-known Ramsden eyepiece, and serves to project on to a screen F superimposed images of the object B and of the graticule $C^1$. One important use, to which this arrangement may be put, is to determine the correctness of shape of the profile of an object by comparing it with a master drawing, and in this case the projection screen F will itself bear the master drawing and the graticule $C^1$ will serve to enable accurate measurements to be made of any errors in the shape of the profile. Alternatively, the graticule $C^1$ may consist of shaped markings and may itself serve in place of a master drawing, the superimposed images on the screen F thus permitting comparison of the profile with the graticule markings. It will be appreciated that for such purposes it is important that the projected image should be substantially free from distortion and oblique colour, and the primary purpose of the invention is so to improve an eyepiece of the Ramsden type as to correct for the distortion usually present therein.

It is of course important that the objective A should be such as to give a primary image well-corrected for distortion and other aberrations and an objective of the kind described in the above-mentioned British patent specification No. 444,350 is satisfactory for this purpose. One example of objective of this kind is shown in Figure 2 and comprises two collective members $A^1 A^2$. The first member $A^1$ consists of an achromatised doublet corrected for distortion and images the light source at the entrance pupil of the second member $A^2$. This second member is self-corrected for chromatic aberrations and distortion and serves to correct the outstanding aberrations of the first member $A^1$. The second member may conveniently consist of an anastigmat lens comprising a dispersive component placed between two collective components.

The ocular E, of which three examples are shown respectively in Figures 3, 4 and 5, comprises a field lens $E^1$ in the form of a simple convergent element disposed adjacent to the primary image plane C of the objective A and on the rear side thereof (i. e., the side further from the objective) and an eyelens system $E^2$ which is of substantial axial thickness and is preferably achromatic and consists of two convergent compound components separated by an airgap, each component having one internal cemented surface. The exit pupil of the ocular E will usually lie within the eyelens system $E^2$ thereof, but in some instances the exit pupil may lie a short distance behind the rear surface of the eyelens system.

Numerical data for the three examples of ocular shown in Figures 3 to 5 are given in the following tables, in which $R_1 R_2 \ldots$ represent respectively the radii of curvature of the individual lens surfaces counting from the front (the positive sign indicating that the surface is convex to the front and the negative sign that it is concave thereto), $D_1 D_2 \ldots$ represent the thicknesses of the individual lens elements along the axis, and $S_1 S_2$ represent the axial airgaps between the components. The tables also give the mean refractive index $n_D$ and Abbé V number of the glass used for each element. The equivalent focal length of the ocular is in each example taken as unity.

*Example I*

| Radius | Thickness or separation | Refractive index $n_D$ | Abbé V number |
|---|---|---|---|
| $R_1 = \infty$ | | | |
| | $D_1 = .115$ | 1.519 | 60.3 |
| $R_2 = -.650$ | | | |
| | $S_1 = .476$ | | |
| $R_3 = +.903$ | | | |
| | $D_2 = .168$ | 1.613 | 59.3 |
| $R_4 = -.613$ | | | |
| | $D_3 = .028$ | 1.652 | 33.5 |
| $R_5 = +5.12$ | | | |
| | $S_2 = .553$ | | |
| $R_6 = +5.12$ | | | |
| | $D_4 = .028$ | 1.652 | 33.5 |
| $R_7 = +.613$ | | | |
| | $D_5 = .168$ | 1.613 | 59.3 |
| $R_8 = -1.433$ | | | |

*Example II*

| Radius | Thickness or separation | Refractive index $n_D$ | Abbé V number |
|---|---|---|---|
| $R_1 = \infty$ | | | |
| | $D_1 = .120$ | 1.519 | 60.3 |
| $R_2 = -.676$ | | | |
| | $S_1 = .495$ | | |
| $R_3 = +.940$ | | | |
| | $D_2 = .175$ | 1.613 | 59.3 |
| $R_4 = -.638$ | | | |
| | $D_3 = .029$ | 1.652 | 33.5 |
| $R_5 = +5.33$ | | | |
| | $S_2 = .576$ | | |
| $R_6 = +1.92$ | | | |
| | $D_4 = .029$ | 1.652 | 33.5 |
| $R_7 = +.638$ | | | |
| | $D_5 = .048$ | 1.613 | 59.3 |
| $R_8 = -2.92$ | | | |

*Example III*

| Radius | Thickness or separation | Refractive index $n_D$ | Abbé V number |
|---|---|---|---|
| $R_1 = \infty$ | | | |
| | $D_1 = .106$ | 1.519 | 60.3 |
| $R_2 = -.5971$ | | | |
| | $S_1 = .436$ | | |
| $R_3 = +.8325$ | | | |
| | $D_2 = .153$ | 1.613 | 59.3 |
| $R_4 = -.5638$ | | | |
| | $D_3 = .027$ | 1.652 | 33.5 |
| $R_5 = +4.708$ | | | |
| | $S_2 = .667$ | | |
| $R_6 = +4.708$ | | | |
| | $D_4 = .026$ | 1.652 | 33.5 |
| $R_7 = +.5638$ | | | |
| | $D_5 = .153$ | 1.613 | 59.3 |
| $R_8 = -1.433$ | | | |

The distances of the flat front surface ($R_1$) of the field lens $E^1$ respectively from the exit pupil of the objective A and from the internal focal plane C of the microscope are in Example I 4.00 and .186, in Example II 4.13 and .196 and in Example III 3.44 and .458. The total axial thickness of the eyelens $E^2$ is in Example I .945, in Example II .857 and in Example III 1.026. The equivalent focal length of the eyelens system $E^2$ is in Example I 1.27, in Example II 1.267 and in Example III 1.26 so that the power of the eyelens system is in each example between 78 and 80% of the power of the complete ocular E. The exit pupil of the ocular E lies within the eyelens system $E^2$ in Examples I and III and a short distance outside the eyelens system in Example II, the position being in Example I .032 inside the rear surface ($R_8$), in Example II .044 behind the rear surface ($R_8$) and in Example III .042 in front of the front surface ($R_8$) of the rear component.

It will be appreciated that the foregoing arrangement can be modified in various ways within the scope of the invention, for example, by employing a simple element in place of one of the compound components of the eyelens or again by employing more than two components for the eyelens system.

What I claim as my invention and desire to secure by Letters Patent is:

1. A lens system, corrected for chromatic aberrations, astigmatism, field curvature and distortion, for use as the ocular of a compound microscope, comprising in combination in axial alignment a convergent field lens, and a convergent eyelens system whose focal length lies between 115 and 140 per cent of the equivalent focal length of the complete ocular lens system and whose axial thickness is not less than 60 per cent of the equivalent focal length of the complete lens system.

2. A lens system as claimed in claim 1, in which the eyelens system comprises at least two air-separated convergent components.

3. A lens system as claimed in claim 1, in which the eyelens system consists of two compound convergent components separated by an air gap.

4. A lens system, corrected for chromatic aberrations, astigmatism, field curvature and distortion, for use as the ocular of a compound microscope as set forth in claim 1, wherein the exit pupil of the ocular is separated from the rear surface of the eyelens system by a distance not greater than 15 per cent of the equivalent focal length of the complete ocular lens system.

5. A lens system, corrected for chromatic aberrations, astigmatism, field curvature and distortion, for use as the ocular of a compound microscope, comprising in combination in axial alignment a convergent field lens, and a convergent eyelens system whose focal length lies between 115 and 140 per cent of the equivalent focal length of the complete ocular lens system and wherein the exit pupil of the ocular lies within the eyelens system thereof, said eyelens system comprising two air-separated compound convergent components with an axial thickness not less than 60 per cent of the equivalent focal length of the complete ocular lens system.

6. A lens system, corrected for chromatic aberrations, astigmatism, field curvature and distortion, for use as the ocular of a compound microscope, comprising in combination in axial alignment a convergent field lens, and a convergent eyelens system whose focal length lies between 115 and 140 per cent of the equivalent focal length of the complete ocular lens system and wherein the exit pupil of the ocular lies behind the rear surface of the eyelens system at a distance not greater than 15 per cent of the equivalent focal length of the complete ocular lens system, said eyelens system comprising two air-separated compound convergent components with an axial thickness not less than 60 per cent of the equivalent focal length of the complete ocular lens system.

7. A lens system, corrected for chromatic aberrations, astigmatism, field curvature and distortion, for use as the ocular of a compound microscope, comprising in combination in axial alignment a convergent field lens, and a convergent eyelens system whose focal length lies between 115 and 140 per cent of the equivalent focal length of the complete ocular lens system and wherein the exit pupil of the ocular lies within the eyelens system thereof.

8. A lens system, corrected for chromatic aberrations, astigmatism, field curvature and distortion, for use as the ocular of a compound microscope, comprising in combination in axial alignment a convergent field lens, and a convergent eyelens system whose focal length lies between 115 and 140 per cent of the equivalent focal length of the complete ocular lens system and wherein the exit pupil of the ocular lies behind the rear surface of the eyelens system at a distance not greater than 15 per cent of the equivalent focal length of the complete ocular lens system.

9. A compound microscope, comprising in combination an objective, and an ocular consisting of a convergent field lens and a convergent eyelens system, the field lens being disposed adjacent to the primary image plane of the objective, whilst the focal length of the eyelens system lies between 115 and 140 per cent of the equivalent focal length of the whole ocular, the exit pupil of the ocular being separated from the rear surface of the eyelens system by a distance not greater than 15 per cent of the equivalent focal length of the complete ocular.

10. A compound microscope as claimed in claim 11, in which the objective comprises two convergent components, of which the first is a field member acting to form an image of the light source at the entrance pupil of the second component, which acts to correct the outstanding aberrations of the first component.

11. A compound microscope, comprising in combination an objective, and an ocular consisting of a convergent field lens and a convergent eyelens system, the field lens being disposed adjacent to the primary image plane of the objective, whilst the eyelens system has a focal length lying between 115 and 140 per cent of the equivalent focal length of the whole ocular and axial thickness not less than 60 per cent of the equivalent focal length of the complete ocular, the exit pupil of the ocular being separated from the rear surface of the eyelens system by a distance not greater than 15 per cent of the equivalent focal length of the complete ocular.

12. A compound microscope, comprising in combination an objective, and an ocular consisting of a convergent field lens, and a convergent eyelens system whose focal length lies between 115 and 140 per cent of the equivalent focal length of the complete ocular lens system and whose axial thickness is not less than 60 per cent of the equivalent focal length of the complete lens system, the field lens being disposed adjacent to the primary image plane of the objective, whilst the exit pupil of the ocular lies within the eyelens system thereof.

13. A compound microscope as claimed in claim 11, in which the objective comprises two convergent components, of which the first is a field member acting to form an image of the light source at the entrance pupil of the second component, which acts to correct the outstanding aberrations of the first component, whilst the eyelens system of the ocular comprises at least two air-separated convergent components.

14. A compound microscope as claimed in claim 12, in which the objective comprises two convergent components, of which the first is a field member acting to form an image of the light source at the entrance pupil of the second component, which acts to correct the outstanding aberrations of the first component, whilst the eyelens system of the ocular comprises at least two air-separated convergent components.

15. A lens system for use as the ocular of a compound microscope having numerical data substantially as set forth in the following table:

| Radius | Thickness or separation | Refractive index $n_D$ | Abbé V number |
|---|---|---|---|
| $R_1 = \infty$ | | | |
| | $D_1 = .115$ | 1.519 | 60.3 |
| $R_2 = -.650$ | | | |
| | $S_1 = .476$ | | |
| $R_3 = +.903$ | | | |
| | $D_2 = .168$ | 1.613 | 59.3 |
| $R_4 = -.613$ | | | |
| | $D_3 = .028$ | 1.652 | 33.5 |
| $R_5 = +5.12$ | | | |
| | $S_2 = .553$ | | |
| $R_6 = +5.12$ | | | |
| | $D_4 = .028$ | 1.652 | 33.5 |
| $R_7 = +.613$ | | | |
| | $D_5 = .168$ | 1.613 | 59.3 |
| $R_8 = -1.433$ | | | | wherein $R_1R_2$ indicate the radii of the individual surfaces, $D_1D_2$ ... the axial thickness of the individual elements, and $S_1S_2$ the axial air separations between the components.

16. A lens system for use as the ocular of a compound microscope having numerical data substantially as set forth in the following table:

| Radius | Thickness or separation | Refractive index $n_D$ | Abbé V number |
|---|---|---|---|
| $R_1 = \infty$ | $D_1 = .120$ | 1.519 | 60.3 |
| $R_2 = -.676$ | | | |
| $R_3 = +.940$ | $S_1 = .495$ | | |
| $R_4 = -.638$ | $D_2 = .175$ | 1.613 | 59.3 |
| $R_5 = +5.33$ | $D_3 = .029$ | 1.652 | 33.5 |
| $R_6 = +1.92$ | $S_2 = .576$ | | |
| $R_7 = +.638$ | $D_4 = .029$ | 1.652 | 33.5 |
| $R_8 = -2.92$ | $D_5 = .048$ | 1.613 | 59.3 | wherein $R_1R_2$ indicate the radii of the individual surfaces, $D_1D_2$ ... the axial thickness of the individual elements, and $S_1S_2$ the axial air separations between the components.

17. A lens system for use as the ocular of a compound microscope having numerical data substantially as set forth in the following table:

| Radius | Thickness or separation | Refractive index $n_D$ | Abbé V number |
|---|---|---|---|
| $R_1 = \infty$ | $D_1 = .106$ | 1.519 | 60.3 |
| $R_2 = -.5971$ | | | |
| $R_3 = +.8325$ | $S_1 = .436$ | | |
| $R_4 = -.5638$ | $D_2 = .153$ | 1.613 | 59.3 |
| $R_5 = +4.708$ | $D_3 = .027$ | 1.652 | 33.5 |
| $R_6 = +4.708$ | $S_2 = .667$ | | |
| $R_7 = +.5638$ | $D_4 = .026$ | 1.652 | 33.5 |
| $R_8 = -1.433$ | $D_5 = .153$ | 1.613 | 59.3 | wherein $R_1R_2$ indicate the radii of the individual surfaces, $D_1D_2$ ... the axial thickness of the individual elements, and $S_1S_2$ the axial air separations between the components.

ARTHUR WARMISHAM.